(No Model.)
A. BENSON.
BICYCLE.
No. 566,053. Patented Aug. 18, 1896.
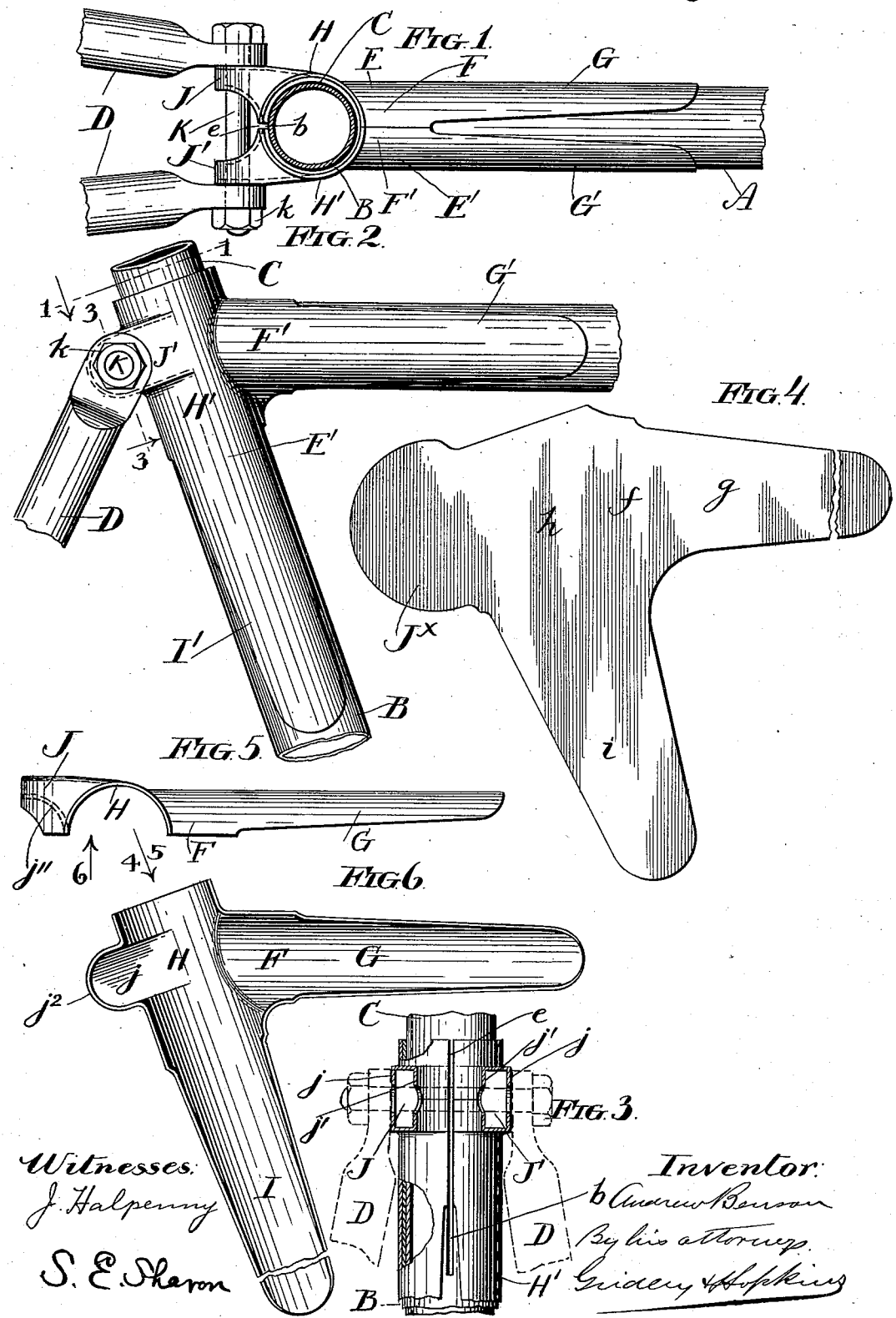

UNITED STATES PATENT OFFICE.

ANDREW BENSON, OF CHICAGO, ILLINOIS, ASSIGNOR TO THE CHICAGO STAMPING COMPANY, OF SAME PLACE.

BICYCLE.

SPECIFICATION forming part of Letters Patent No. 566,053, dated August 18, 1896.

Application filed November 18, 1895. Serial No. 569,244. (No model.)

*To all whom it may concern:*

Be it known that I, ANDREW BENSON, a citizen of the United States, residing at Chicago, in the county of Cook and State of Illinois, have invented certain new and useful Improvements in Bicycles and other Vehicles, of which the following is a specification.

The present invention relates to the means for securing together the parts of the frame of a bicycle or other velocipede; and it consists in the features of novelty that are particularly pointed out in the claims hereinafter, and in order that it may be fully understood I will describe it with reference to the accompanying drawings, which are made a part of this specification, and in which—

Figure 1 is a plan view of a portion of a bicycle embodying the invention, the saddle-post being shown in section in the line 1 1, Fig. 2, and the parts being viewed in the direction of the arrow in said figure. Fig. 2 is a side elevation thereof. Fig. 3 is a rear view thereof, with some of the parts in section on the line 3 3, Fig. 2, others broken away, and still others indicated by dotted lines. Fig. 4 is a plan view of a sheet-metal blank from which either of the two parts of the fitting may be made. Figs. 5 and 6 are elevations of this blank viewed in the direction of the arrows 5, Fig. 6, and 6, Fig. 5, respectively, after it has been subjected to the action of dies and trimmed for the purpose of making one of the two parts of the fitting.

A represents a portion of the ridge-pole; B, a portion of the king-post; C, a portion of the saddle-post, and D portions of the rear inclined braces, all of which are made of meta-tubing of the proper thickness and diameter.

In order to secure the rear end of the ridge-pole and the upper end of the king-post together, I use the fitting comprising the two parts E E', each of which, before the parts are assembled and secured together, is separate from the other and made of a single piece of sheet metal stamped or drawn by dies to the proper shape. These two parts of the fitting have semicylindrical portions F F', which come together and form a tubular socket in which the rear end of the ridge-pole fits, tongues G G' extending from said semicylindrical portions and along the sides of the ridge-pole for the purpose of reinforcing it, semicylindrical portions H H', which come together and form a socket in which the upper end of the king-post fits, and tongues I I' extending from said semicylindrical portions and along the sides of the king-post for the purpose of reinforcing it. In the completed structure the ridge-pole and king-post are brazed in place in the fitting, and wherever they meet the edges of the two parts of the fitting are brazed together.

The two parts of the fitting are provided with perforated ears J J' that extend rearward, and between these ears the fitting is left open, as shown at $e$, the king-post, which extends quite to the upper end of the fitting, being split opposite this opening $e$, as shown at $b$.

In practice the semicylindrical portions H H' of the fitting are brazed to the king-post, as already described, and the openings $e$ and $b$ are made by saw or cutter. Their object is to permit the contraction of the upper end of the fitting and king-post for the purpose of clamping the saddle-post C in the king-post and holding it securely in place. This is accomplished by means of a bolt K, which passes through the perforations of the ears J J' and is provided with a nut $k$. This bolt also passes through perforations in the upper ends of the rear inclined braces D and serves to fasten them to the ears J J'.

It will be seen that the ears J J' are hollow and have flat outside walls $j$, curved inside walls $j'$, and curved top, bottom, and rear walls $j^2$, so that in the completed article the fitting presents the same finished and substantial appearance as does a forging.

The blank from which either of the two parts of the fitting may be made is shown in Fig. 4. It comprises a body portion $h$, tongues $f$, $g$, and $i$, and an ear $J^\times$, which portions, in the completed article, form the parts H, F, G, I, and J, respectively, of the part E, or the corresponding parts of the part E', accordingly as the blank is subjected to the one or the other of the two sets of dies.

In Figs. 5 and 6 I have shown the blank after it has been subjected to the dies and trimmed for the purpose of forming it into the part E. These dies bring the blank at one operation to approximately the shape shown in Figs. 5 and 6. At a single operation they complete the part, excepting that a certain amount of trimming remains to be done and the ears are to be finished. The dies draw the ear $J^\times$ of the blank up into the shape of a box having the flat side wall $j$ and the curved top, bottom, and rear walls $j^2$, and in order to form the inner curved wall $j'$ of the completed ear the curved walls $j^2$, which the box has after leaving the dies, is drawn inward from all directions until it follows the dotted line $j''$ in Fig. 5, a suitable block or mandrel being placed within it while this is being done. This done, after perforating the walls $j\,j'$ of the same the part is ready for use.

I am aware of the English patent of Boult, dated December 16, 1893, and numbered 24,279, which shows a fitting similar to the one herein shown, described, and claimed, excepting that the ears of the fitting have no inner walls which close the space included by the top, bottom, and rear walls. With these inner walls omitted the fitting is not only very much weaker than it is when they are present, but it appears to be very much weaker than it really is, and this appearance, even if it were unsupported by fact, is enough to destroy the commercial value of the Boult fitting. Furthermore, by closing the inner sides of the ears the fitting is given a very much more finished appearance and is without any opening in which dirt can accumulate.

Having thus described my invention, the following is what I claim as new therein and desire to secure by Letters Patent:

1. The combination with the parts of a frame, of a sheet-metal fitting by which they are secured together, said fitting having a pair of hollow ears each of which has an outside wall, top, bottom and rear walls, and an inside wall closing the space included by the top, bottom and rear walls, the outside and inside walls being perforated, substantially as set forth.

2. The combination with the parts of a frame, of a two-part sheet-metal fitting by which they are secured together, each of the two parts of the fitting being provided with a hollow ear comprising an outside wall, top, bottom and rear walls, and an inside wall closing the space included by the top, bottom, and rear walls, the outside and inside walls being perforated and the fitting being split between the ears, substantially as set forth.

3. The combination with a ridge-pole, the king-post and the rear inclined braces of the frame of a bicycle, of a two-part sheet-metal fitting by which these parts are secured together, each of the two parts of the fitting having one-half of the socket in which the rear end of the ridge-pole fits, one-half of the socket in which the upper end of the king-post fits, and a hollow ear comprising an outside wall, top, bottom and rear walls, and an inside wall closing the space included by the top, bottom and rear walls, the outside and inside walls being perforated for the passage of a bolt by which the upper ends of the rear inclined braces are secured to them, the fitting being split between the ears, substantially as set forth.

ANDREW BENSON.

Witnesses:
L. M. HOPKINS,
S. E. SHARON.